United States Patent [19]

Ushijima et al.

[11] Patent Number: 4,616,962
[45] Date of Patent: Oct. 14, 1986

[54] CUTTER INSERT

[75] Inventors: Hiroyuki Ushijima, Yokohama; Hiroshi Shimomura; Masaaki Nakayama, both of Tokyo, all of Japan

[73] Assignee: Mitsubishi Kinzoku Kabushiki Kaisha, Tokyo, Japan

[21] Appl. No.: 724,665

[22] Filed: Apr. 18, 1985

[30] Foreign Application Priority Data

Apr. 28, 1984 [JP] Japan ................ 59-63810[U]

[51] Int. Cl.$^4$ ............... B23B 27/22; B26D 1/00; B23C 5/20
[52] U.S. Cl. ................................. 407/113; 407/114
[58] Field of Search ............. 407/113, 114, 115, 116

[56] References Cited

U.S. PATENT DOCUMENTS 3,940,835  3/1976  Friedline et al. ............ 407/113
3,955,259  5/1976  Gustafsson ................. 407/113

FOREIGN PATENT DOCUMENTS 2405234  1/1975  Fed. Rep. of Germany ...... 407/113
145070  11/1980  Fed. Rep. of Germany ...... 407/115
125904  9/1980  Japan ........................... 407/115
951624  3/1964  United Kingdom ............. 407/113
848152  7/1981  U.S.S.R. ...................... 407/113

Primary Examiner—Francis S. Husar
Assistant Examiner—Jerry Kearns
Attorney, Agent, or Firm—Cushman, Darby & Cushman

[57] ABSTRACT

An indexable cutter insert for a rotary cutter includes a generally polygonal plate defined by a front face, a rear face and a plurality of side faces. The corner portions of the plate where adjacent side faces intersect one another are removed to provide respective corner faces. The plate has a plurality of main cutting edges each defined by the front face and a respective one of the side faces and a plurality of auxiliary cutting edges each defined by the front face and a respective one of the corner faces. Each side face serves as a relief surface of a respective one of the main cutting edges. A forward portion of each corner face remote from the rear face serves as a relief surface of a respective one of the auxiliary cutting edges. A rearward portion of each corner face remote from the front face is offset inwardly from the forward portion to provide a clearance surface. The clearance surface extends from the rear face to a plane generally centrally of the thickness of the plate.

4 Claims, 11 Drawing Figures

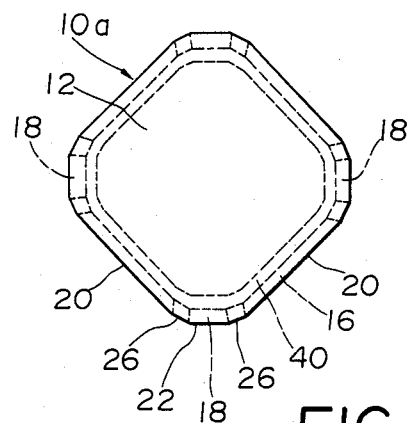
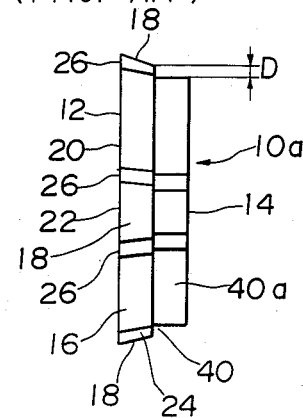
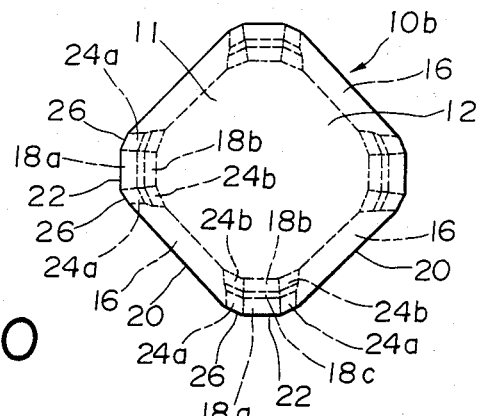
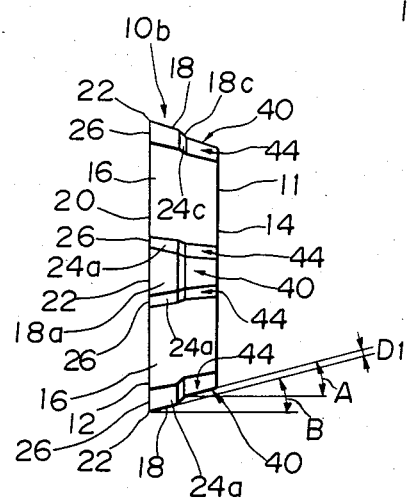
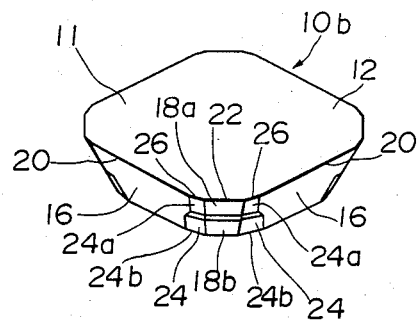

CUTTER INSERT

BACKGROUND OF THE INVENTION

1. Field of the Invention

This invention relates to an indexable cutter insert for a rotary cutter such as a face milling cutter.

2. Prior Art

One conventional cutter insert 10 of the indexable type shown in FIGS. 1 to 3 comprises a plate of a generally square shape defined by a front face 12, a rear face 14 disposed parallel to the front face 12, and four side faces 16. The four corners of the insert 10 are removed to provide four corner faces 18. The insert 10 has four main cutting edges 20 each defined by the front face 12 and a respective one of the side faces 16, and four auxiliary cutting edges 22 each defined by the front face 12 and a respective one of the corner faces 18. That corner portion where each adjacent side face 16 and corner face 18 intersect is chamfered to provide a chamfered surface 24, and each chamfered surface 24 cooperates with the front face 12 to define a corner cutting edge 26.

FIGS. 4 to 6 show a face milling cutter 28 employing a plurality of inserts 10 of the type described. The milling cutter 28 includes a generally disc-shaped body 28a having a plurality of pockets or recesses 30 formed in a forward end face 32 thereof in circumferentially spaced relation to one another. Each insert 10 is received in a respective one of the pockets 30 and fixed thereto by a clamping wedge 34 and a retaining plate 36 between which the insert 10 is sandwiched. In this condition, the indexed auxiliary cutting edges 22 are disposed slightly beyond the forward end face 32 of the cutter body 28a and substantially in a common plane perpendicular to the axis X of rotation of the cutter body 28a. The indexed main cutting edge 20 of each insert 10 disposed adjacent to the indexed auxiliary cutting edge 22 and directed radially outwardly of the cutter body 28a serves as a peripheral cutting edge of the milling cutter 28. As is well known in the art, the auxiliary cutting edge 22 of the inserts 10 serve to provide a finish surface of a workpiece processed by the milling cutter 28. Therefore, it is necessary that the indexed auxiliary cutting edges 22 of the inserts 10 should be located in their respective indexing positions, that is to say, in the common plane perpendicular to the axis X of rotation of the cutter body 28a as accurately as possible so as to provide a satisfactory finish surface of the workpiece. Each corner face 18 of the conventional insert 10 shown in FIGS. 1 to 4 is ground so that the auxiliary cutting edge 22 adjacent to the corner face 18 is disposed as close to its indexing position as possible when the insert 10 is attached to the cutter body 28a. Since each corner face 18 is formed by a substantially flat surface, the entire corner face 18 must be ground despite the fact that the corner face 18 actually has only to be ground at that portion adjacent to the auxiliary cutting edge 22. This is undesirable from an economical point of view because much labor and time are required for the grinding of the corner face 18.

In order to overcome the above difficulty, there has been proposed another conventional insert 10a shown in FIGS. 7 and 8 which differs from the above-mentioned insert 10 in that a rearward portion of a peripheral surface remote from a front face 12 is offset inwardly throughout the entire periphery thereof to provide a clearance portion 40. The peripheral surface 40a of the clearance portion 40 serves as a clearance surface. With this conventional insert, it is necessary to grind only a forward portion of each corner face 18 remote from a rear face 14 to provide a required auxiliary cutting edge 22. This saves time and labor. However, since the clearance portion 40 is provided around the entire periphery of the insert 10a, the strengths of the main, auxiliary and corner cutting edges 20, 22 and 26 are lowered. This problem is serious particularly with respect to the main cutting edges 20 because they are subjected to an increased cutting load during the cutting operation and therefore are susceptible to breakage or damage. In addition, the peripheral surface 40a of the clearance portion 40 is disposed perpendicular to the front and rear faces 12 and 14 so that a clearance depth D of the clearance portion 40 is relatively large. This not only aggravates the problem of breakage of the main cutting edges 20 but also affects the auxiliary and corner cutting edges 22 and 26.

SUMMARY OF THE INVENTION

It is therefore an object of this invention to provide an indexable cutter insert for rotary cutters which has corner faces which can be ground in a shorter time to provide required auxiliary cutting edges without substantially reducing the strength of the main and auxiliary cutting edges.

According to the present invention, there is provided a indexable cutter insert for a rotary cutter which comprises a generally polygonal plate defined by a front face, a rear face and a plurality of side faces, the corner portions of the plate where adjacent side faces intersect one another being removed to provide respective corner faces, the plate having a plurality of main cutting edges each defined by the front face and a respective one of the side faces and a plurality of auxiliary cutting edges each defined by the front face and a respective one of the corner faces, each side face serving as a relief surface of a respective one of the main cutting edge, a forward portion of each corner face remote from the rear face serving as a relief surface of a respective one of the auxiliary cutting edge, a rearward portion of each corner face remote from the front face being offset inwardly from the forward portion to provide a clearance surface, and the clearance surface extending from the rear face to a plane generally centrally of the thickness of the plate.

BRIEF DESCRIPTION OF THE DRAWINGS

FIG. 7 is a plan view of another conventional cutter insert;

FIG. 8 is a side-elevational view of the insert of FIG. 7;

FIG. 9 is a plan view of a cutter insert provided in accordance with the present invention;

FIG. 10 is a side-elevational view of the insert of FIG. 9; and

FIG. 11 is a perspective view of the insert of FIG. 9.

DESCRIPTION OF THE PREFERRED EMBODIMENT OF THE INVENTION

Figure 1:
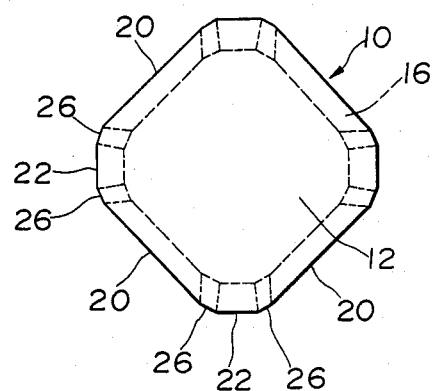
FIG. 1 is a plan view of a conventional cutter insert.
Figure 2:
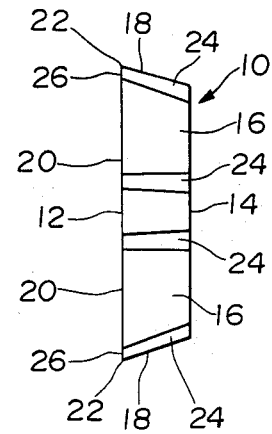
FIG. 2 is a side-elevational view of the insert.
Figure 3:
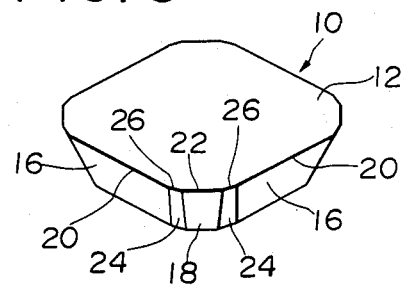
FIG. 3 is a perspective view of the insert.
Figure 4:
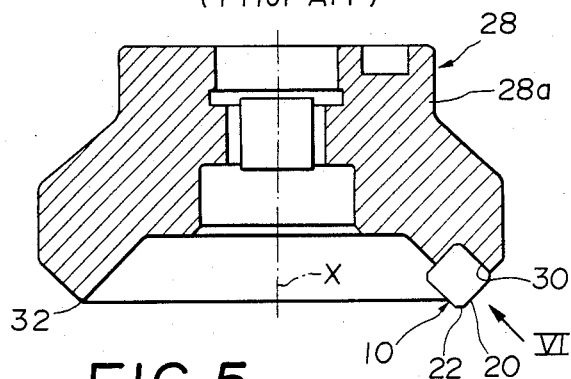
FIG. 4 is a cross-sectional view of a face milling cutter employing the inserts.
Figure 6:
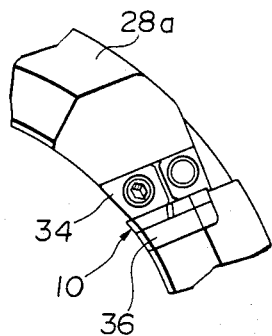
FIG. 6 is a fragmentary perspective view of the milling cutter as viewed in the direction VI of FIG. 5.
Figure 5:
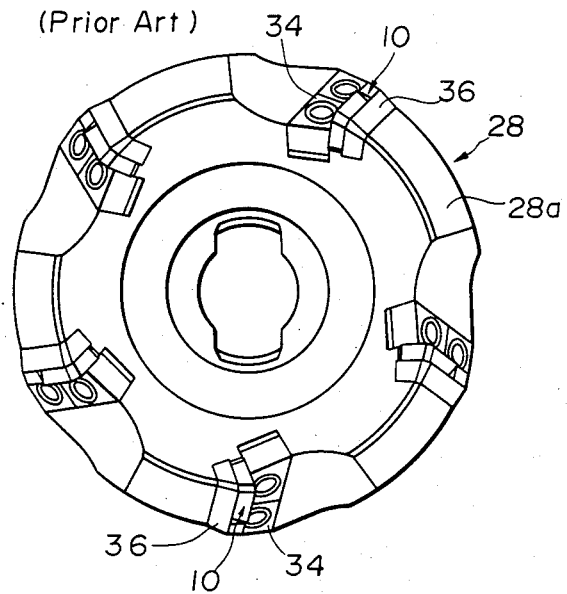
FIG. 5 is a front end view of the milling cutter.

A cutter insert 10b of the indexable type shown in FIGS. 9 to 10 comprises a generally square plate 11 of a uniform thickness defined by a flat front face 12, a flat rear face 14 disposed parallel to the front face 12, and four flat side faces 16. The insert plate 11 is preferably made of a sintered hard material such as cemented carbide. Each of the side faces 16 is sloping inwardly in a direction away from the front face 12. The four corners of the insert 10b are removed to provide four corner faces 18. Each of the corner faces 18 is sloping inwardly in a direction away from the front face 12. The insert 10b has four main cutting edges 20 each defined by the front face 12 and a respective one of the side faces 16, and four auxiliary cutting edges 22 each defined by the front face 12 and a respective one of the corner faces 18. Each side face 16 serves as a relief surface of a respective one of the main cutting edges 20, and that portion of the front face 12 disposed adjacent to and extending along a respective one of the main cutting edges 20 serves as a rake surface. That corner portion where each adjacent side face 16 and corner face 18 intersect is chamfered to provide a chamfered surface 24, and each chamfered surface 24 cooperates with the front face 12 to define a corner cutting edge 26 which is disposed between a respective one of the main cutting edge 20 and a respective one of the auxiliary cutting edge 22. Each chamfered surface 24 is sloping inwardly in a direction away from the front face 12. Although the corner cutting edge 26 is straight in the illustrated embodiment, it may be convexly arcuate.

The forward portion of each corner face 18 remote from the rear face 14 serves as a flat relief surface 18a of a respective one of the auxiliary cutting edges 22. As best shown in FIG. 10, the rearward portion of each corner face 18 remote from the front face 12 is offset inwardly toward the center of the insert plate 11 to provide a flat clearance surface 18b parallel to the relief surface 18a of the corner face 18. The corner face 18 also has a narrow connective surface 18c interconnecting the relief surface 18a and the clearance surface 18b and is disposed substantially centrally of the thickness of the insert plate 11. Therefore, each clearance surface 18b extends from the rear face 14 to a plane generally centrally of the thickness of the insert plate 11. Thus, the clearance surface 18b and the connective surface 18c defines a clearance portion 40. Since the clearance surface 18b is disposed parallel to the relief surface 18a, the clearance angle A of the clearance portion 40 is generally equal to the relief angle B of the auxiliary cutting edge 22.

A clearance depth D1 of the clearance portion 40, which is a distance of offset of the clearance surface 18b from the relief surface 18a, is relatively small and is in the range of between about 0.1 mm to about 0.3 mm.

Each chamfered surface 24 also has a clearance portion 44 as described above for each corner face 18. More specifically, the forward portion of the chamfered surface 24 remote from the rear face 14 serves as a flat relief surface 24a of the corner cutting edge 26. The rearward portion of the chamfered surface 24 remote from the front face 12 is offset inwardly toward the center of the insert plate 11 to provide a clearance surface 24b parallel to the relief surface 24a. The relief surface 24a and the clearance surface 24b are interconnected by a narrow connective portion 24c disposed substantially centrally of the thickness of the insert plate 11. The relief angle of the corner cutting edge 26 is equal to the clearance angle of the clearance portion 44.

As described above, since the clearance portion 40 is formed in each of the four corner faces 18, only the relief surface 18a of the corner face 18 has to be ground to provide the required auxiliary cutting edge 22, and there is no need to grind the clearance surface 18b. Therefore, this grinding requires less time and labor. Even more importantly, since no clearance portion is provided in the side faces 16, the strength of the main cutting edges 20 is not lowered so that they are positively prevented from breakage or damage. Further, since the clearance surface 18b of each corner face 18 is disposed parallel to the relief surface 18a with a small clearance depth D1, the breakage of the auxiliary cutting edges 22 are also prevented. Also, each chamfered surface 24 has the clearance portion 44 similar to the clearance portion 40, the breakage of the main cutting edge 20 at opposite ends thereof as well as the breakage of the auxiliary cutting edge 22 is prevented.

While the cutter insert according to the present invention has been specifically shown and described herein, the invention itself is not to be restricted to the exact showing of the drawings or the description thereof. For example, the chamfered surfaces 24 may be omitted.

What is claimed is:

1. An indexable cutter insert for a rotary cutter comprising a generally polygonal plate defined by a front face, a rear face and a plurality of side faces, the corner portions of said plate where adjacent side faces intersect one another being removed to provide respective corner faces, said plate having a plurality of main cutting edges each defined by said front face and a respective one of said side faces and a plurality of auxiliary cutting edges each defined by said front face and a respective one of said corner faces, each side face seving as a relief surface of a respective one of said main cutting edges, a forward portion of each corner face remote from said rear face serving as a relief surface of a respective one of said auxiliary cutting edges, a rearward portion of each corner face remote from said front face being offset inwardly from said forward portion to provide a clearance surface, each corner face having a connective surface interconnecting said forward and rearward portions and sloping inwardly from said forward portion toward said rearward portion, and said clearance surface extending from said rear face to a plane generally centrally of the thickness of said plate.

2. An indexable cutter insert according to claim 1, in which each clearance surface is disposed generally parallel to said forward portion.

3. An indexable cutter insert according to claim 1, in which each clearance surface is offset from said forward portion a distance of about 0.1 mm to about 0.3 mm.

4. An indexable cutter insert according to claim 1, claim 2 or claim 3 in which the corner of said plate where each adjacent side face and corner face intersect each other is chamfered to provide a chamfered surface, said plate having a plurality of corner cutting edges each defined by said front face and a respective one of said chamfered surfaces, a forward portion of each chamfered surface remote from said rear face serving as a relief surface of a respective one of said corner cutting edges, and a rearward portion of each chamfered surface remote from said front face being offset inwardly from said forward portion of said chamfered surface to provide a clearance surface extending from said rear face to a plane generally centrally of the thickness of said plate, each chamfered surface having a connective surface interconnecting said forward and rearward portions of said chamfered surface and sloping inwardly from said forward portion of said chamfered surface toward said rearward portion of said chamfered surface.

* * * * *